United States Patent
O'Brien (10) Patent No.: US 6,419,442 B1
(45) Date of Patent: Jul. 16, 2002

(54) MECHANISM AND METHOD FOR FORMING A STACK OF ARTICLES

(75) Inventor: Terrence E. O'Brien, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 09/139,376

(22) Filed: Aug. 25, 1998

(51) Int. Cl.7 .............................................. B65G 61/00
(52) U.S. Cl. .................................. 414/798.7; 414/790.3
(58) Field of Search ........................... 414/790.3, 798.7; 271/215

(56) References Cited

U.S. PATENT DOCUMENTS

| | | | | |
|---|---|---|---|---|
| 4,805,894 A | * | 2/1989 | Scherer et al. ............ | 414/798.7 |
| 4,861,225 A | | 8/1989 | Dorner et al. ............ | 414/789.9 |
| 4,861,226 A | | 8/1989 | Dorner et al. ............ | 414/790.3 |
| 4,993,916 A | | 2/1991 | Dorner ..................... | 414/798.7 |
| 5,030,058 A | | 7/1991 | Dorner et al. ............ | 414/798.4 |

FOREIGN PATENT DOCUMENTS

DE                41017     * 10/1965 .............. 414/798.7

* cited by examiner

Primary Examiner—Janice L. Krizek
(74) Attorney, Agent, or Firm—Andrus, Sceale, Starkes & Sawall, LLP (57) ABSTRACT

A method and apparatus for stacking articles in a side-by-side stack and feeding the stacks to a discharge conveyor. Articles such as video cassette containers or CD containers, are conveyed in an upright singulated fashion by a guide arrangement. Each individual article enters a transfer location where it is supported by a transfer platform. A pusher device extends to push the article from the transfer location onto a support platform. The support platform supports the individual articles as they are assembled into a stack. After the pusher device has been retracted, a hold-back member is extended to support the outermost article of the assembled stack. Once a stack of articles has been assembled, a stack pusher assembly pushes the stack off of the support platform and onto an outfeed conveyor assembly. A back-up slide assembly supports the outermost article of the stack as the stack is assembled by the stacker mechanism.

18 Claims, 6 Drawing Sheets

MECHANISM AND METHOD FOR FORMING A STACK OF ARTICLES

BACKGROUND OF THE INVENTION

Conveying systems are often employed to convey articles through a series of working stations. In certain conveyor systems, it is desired to form a stack of articles from a single transferred row of articles and transfer the assembled stack to packaging or other working equipment. Frequently, a variety of article sizes are conveyed in an intermingled order and the conveying system is operable to separate the articles based on the type and/or size of article before the stack is formed. A series of stacking units are often utilized and the stacking units must be capable of automatically separating and stacking the dissimilar articles and feeding the stacks onto a discharge conveyor without interference between stacks.

SUMMARY OF THE INVENTION

The present invention is directed to a method and apparatus for stacking individual articles and feeding the assembled stack to a discharge conveyor. A plurality of articles, such as video cassette containers, compact disc containers, or the like, are conveyed on an infeed conveyor in an upright singulated fashion. A stacker mechanism receives each of the individual articles on a transfer platform located at a transfer location. Upon receiving one of the articles, an article pusher assembly is activated to push the article off of the transfer platform and onto a support platform. The support platform is used to assemble the stack from the plurality of individual articles fed successively from the transfer location.

The outermost article of the stack is pushed into contact with a backstop contained within a back-up slide assembly. The backstop is connected to a single-acting back-up cylinder that is unpressurized, such that the backstop is free to move along the support platform as the stack is assembled. A friction device contained in the back-up slide assembly provides the required force to support the outermost article of the stack.

A hold-back member is positioned between the transfer location and the support platform such that after an article is added to the stack, the hold-back member is moved to an extended, retaining position, during which the hold-back member supports the innermost article of the stack. Thus, the combination of the hold-back member and the backstop supports the stack at both the inner and outer ends of the stack.

Once a complete stack of articles is assembled on the support platform, a stack pusher assembly is activated to push the stack off of the support platform and onto a discharge or outfeed conveyor assembly. Specifically, the stack pusher assembly includes a pusher plate that is attached to a drive cylinder and is movable between a retracted position and an extended position.

Once a complete stack of articles has been assembled and pushed onto the outfeed conveyor, the pusher plate of the stack pusher assembly is retracted and the backstop of the back-up slide assembly is completely extended by operation of the single-acting back-up cylinder, such that the backstop can receive the first article of a new stack.

Therefore, it is an object of the invention to provide a stacker mechanism that can receive a plurality of single articles and assemble the articles into a side-by-side stack. It is an additional object of the invention to provide a stacker mechanism that supports the stack of articles while the stack is being assembled to prevent the stack from falling apart. It is another object of the invention to provide a stacker mechanism having a hold-back member that supports the innermost article of the stack and can be retracted to permit additional articles to be added to the stack. It is a further object of the invention to provide a method of assembling a stack of articles from a supply fed in a singulated fashion.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
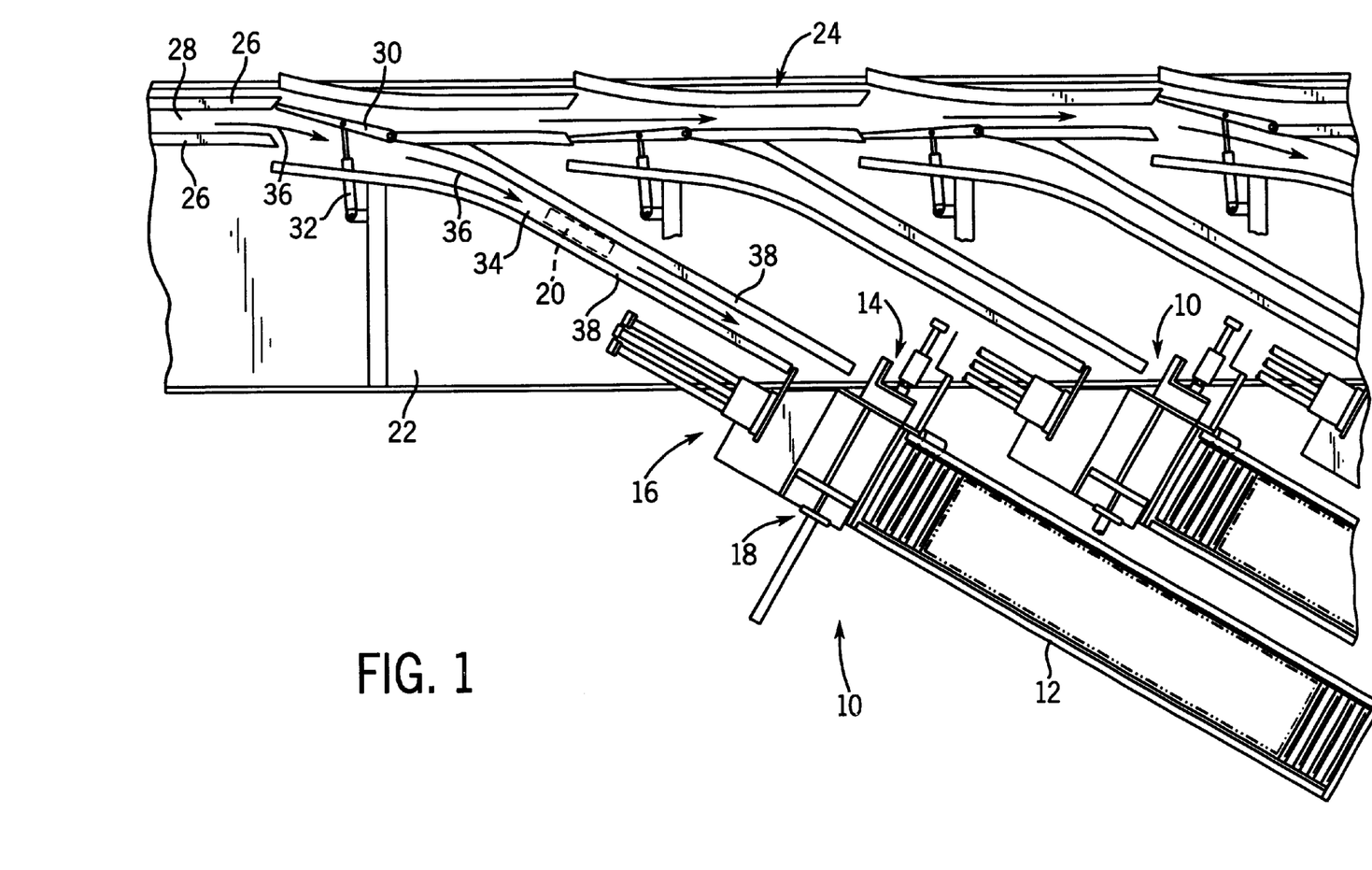
FIG. 1 is a top plan view of the stacker mechanism of the present invention.

FIG. 1 illustrates a stacker mechanism 10 for stacking a plurality of small articles in a side-by-side relation and transferring the assembled stack onto a discharge conveyor assembly 12. Generally, the stacker mechanism 10 includes an article pusher assembly 14, a stack pusher assembly 16 and a back-up slide assembly 18. As shown in FIG. 1, in a typical application for the present invention, a series of stacker mechanisms 10 are aligned such that several stacks of articles can be assembled simultaneously.

Individual articles 20 are sequentially fed to each of the stacker mechanisms 10 in a singulated fashion by a conventional infeed conveyor assembly 22. The articles 20, as illustrated, are generally flat containers, such as video cassette containers, audio cassette containers, compact disc containers, and other types of electronic media containers. Each of the articles 20 is preferably conveyed upright along one of its edge surfaces.

Articles 20 are fed in a single file spaced fashion from an upstream distribution system. In the preferred embodiment of the invention, the upstream distribution system includes a series of dispensers which dispense the articles onto a conveyor, an inverting arrangement for placing the articles 20 on edge, and a bar code reader that is able to accurately and quickly identify the article being moved by the infeed conveyor assembly 22. The system may also include a label applicator station for applying a label to each article 20. At the downstream end of the system, as shown in the figures, the articles 20 pass through a guide assembly 24 that includes a series of guide rails 26. The guide rails 26 are spaced to define a main guideway 28 that directs the individual articles 20 as they are moved by the infeed conveyor assembly 22. Since the stacker mechanism 10 can handle different types and sizes of articles 20, the main guideway 28 is sized to accommodate varying widths of the articles 20. For example, the main guideway 28 is sized to accommodate both a video cassette container and a compact disc container.

The guide assembly 24 includes a series of diverting gates or doors 30 that can be selectively operated to divert articles 20 passing along the guide assembly 24. Each of the diverting doors 30 includes a drive cylinder 32 that can be operated to move the diverting door 30 between a closed position and an open position. When the diverting door 30 is in the open position, as shown by the leftmost diverting door 30 in FIG. 1, the article 20 passing along the infeed conveyor 22 is diverted from the main guideway 28 into a loading guideway 34, as shown by arrows 36. The loading guideway 34 directs the article 20 toward the selected stacker mechanism 10 that requires the article 20 for the stack being assembled. In the preferred embodiment of the invention, the bar code reader positioned upstream of the series of stacker mechanisms detects the identity of the article 20 passing through the guide assembly 24. Based on the identify of the article sensed, an electronic controller can activate one of the drive cylinders 32 to divert the specific article 20 toward the desired stacker mechanism 10 based on the type of article required in the stack being assembled by each of the stacker mechanisms 10. For example, if the first stacker mechanism is assembling a stack of VCR tapes and the second stacker mechanism is assembling a stack of CDs, the electronic controller operates the diverting doors 30 to divert the articles 20 to the proper location. In another example, the articles may all be of the same type, e.g. CDs, and the electronic controller is operable to control doors 30 to divert certain ones of the articles to each stacker mechanism 10 according to the order being assembled at each stacker mechanism 10.

When the diverting door 30 is in the closed position, the individual article 20 continues to move along the main guideway 28 until it reaches a stacker mechanism 10 requiring the specific article 20. If none of the stacker mechanisms 10 require the specific article 20 passing through the main guideway 28, the article 20 is received within a collection bin (not shown) such that the article 20 can be resorted at a later time.

When the diverting door 30 is open, the article 20 enters the loading guideway 34 defined by a pair of stacker guide rails 38. The stacker guide rails 38 direct the article 20 to the article pusher assembly 14 of the stacker mechanism 10.

Figure 2:
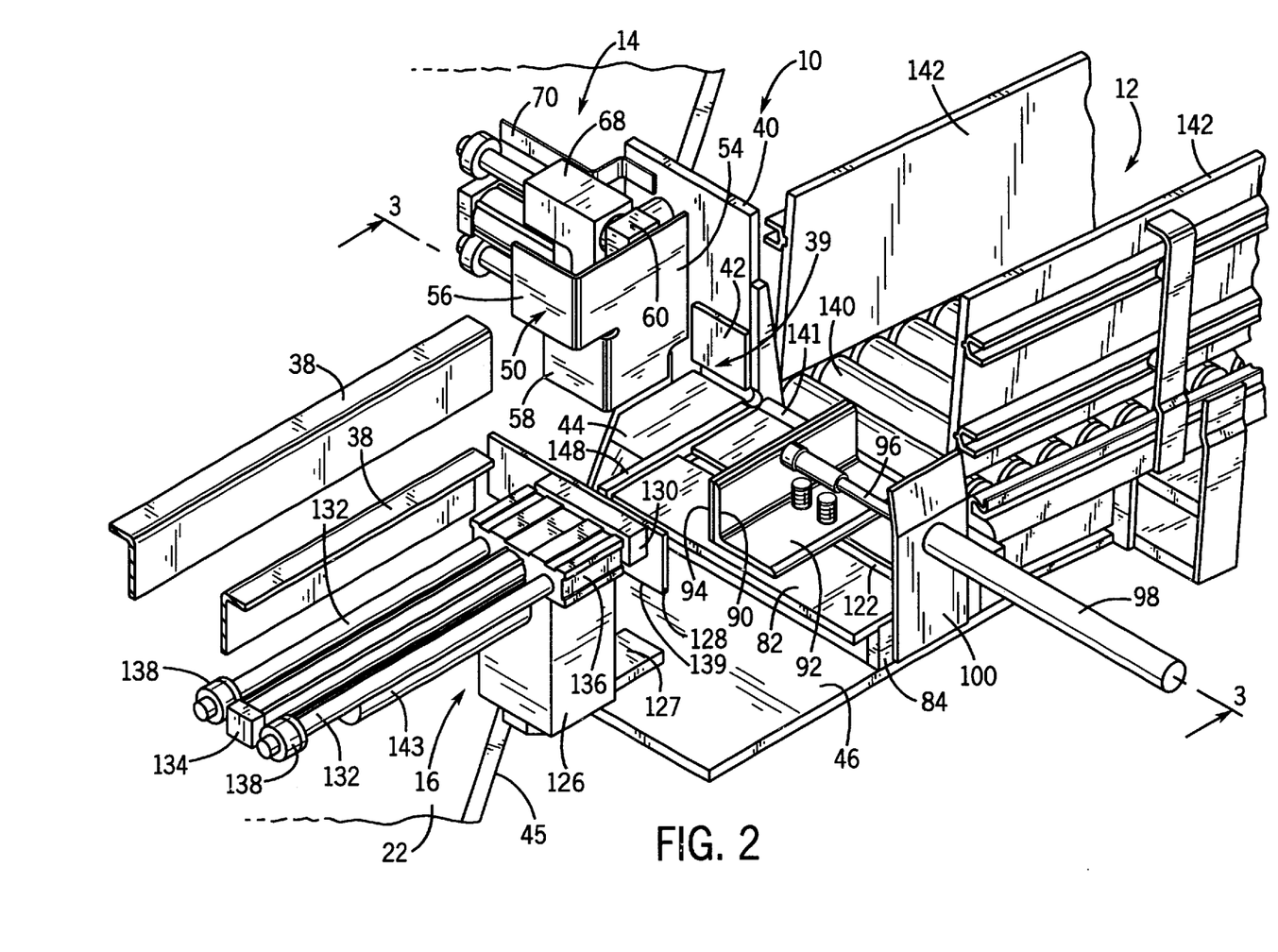
FIG. 2 is an isometric view of the stacker mechanism of the present invention.

When an article 20 exits the pair of stacker guide rails 38, it enters an inclined transfer location 39 of the stacker mechanism 10 and contacts a stop plate 40, as shown in FIG. 2. The stop plate 40 extends upwardly above the moving infeed conveyor assembly 22, such that when the article 20 contacts the stop plate 40, its forward movement in the direction of the infeed conveyor assembly 22 is halted. The stop plate 40 includes a resilient bumper pad 42 which stabilizes article 20 upon impact. The inclination of transfer location 39 provides a gravity bias to maintain article 20 against stop plate 40.

Figures 3, 4:
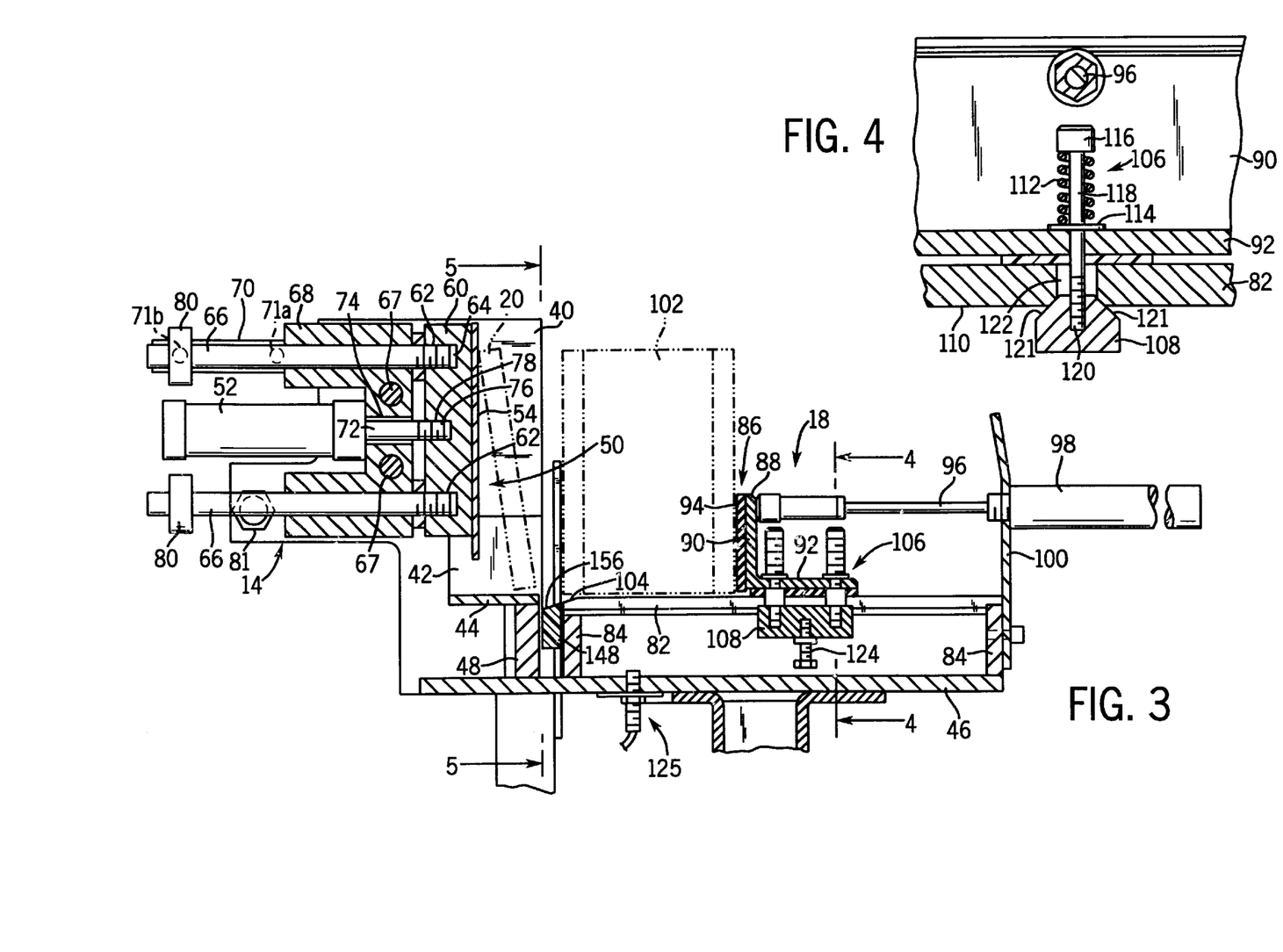
FIG. 3 is a sectional view taken along line 3—3 of FIG. 2 showing the stacker mechanism of the invention and a partially assembled stack of articles.
FIG. 4 is a sectional view taken along line 4—4 of FIG. 3.

Upon leaving the infeed conveyor assembly 22, the article 20 in the transfer location 39 is supported on a transfer platform 44 which is spaced slightly outward from the outer edge 45 of the infeed conveyor assembly 22. The transfer platform 44 defines a generally planar surface sized to receive the variety of articles 20 to be stacked. As can be seen in FIG. 3, the transfer platform 44 is supported above a base plate 46 of the stacker mechanism 10. An upright support 48 is positioned between the transfer platform 44 and the base plate 46 to position the transfer platform 44 above the base plate 46.

The article pusher assembly 14 is positioned adjacent to and slightly above the transfer platform 44, as best shown in FIGS. 2 and 3. The article pusher assembly 14 generally includes a pusher member 50 mounted to a drive cylinder 52 for reciprocal movement between an extended position and a retracted position. In FIGS. 2 and 3, the pusher member 50 and the drive cylinder 52 are shown in their retracted position. The pusher member 50 generally includes a flat pushing surface 54 and a pair of stop surfaces 56 and 58 that are positioned normal to the pushing surface 54. The pair of stop surfaces 56 and 58 act to halt the movement of subsequent articles 20 coming down the infeed conveyor assembly 22 when the pusher member 50 is in the extended position, and thus block access to the transfer location 39 when pusher member 50 is extended.

As best shown in FIG. 3, the pushing surface 54 is securely connected to a mounting block 60 positioned behind the generally flat pushing surface 54. The mounting block 60 includes a pair of threaded bores 62 that each receive a threaded end 64 of one of a pair of guide rods 66. The guide rods 66 pass through a guide block 68 that is supported by a pair of mounting posts 67 attached to the stop plate 40. The stop plate 40, in turn, is supported on the base plate 46, as shown in FIG. 3.

A bracket 70 (FIGS. 2,3) extends from stop plate 40 adjacent guide rod 66. Inner and outer proximity switches 71a, 71b, respectively, are mounted to bracket 70, as shown in FIG. 3. In addition to the pair of guide rods 66, the guide block 68 also supports the drive cylinder 52. In the preferred embodiment of the invention, the drive cylinder 52 is an air cylinder that is driven in both the forward and reverse directions. The drive cylinder 52 includes a cylinder rod 72 that passes through an access opening 74 formed in the guide block 68, and which has a threaded end 76 threadedly engaged within a threaded bore 78 formed in the mounting block 60. In this manner, when the drive cylinder 52 is activated, air pressure within the drive cylinder 52 forces the cylinder rod 72 outward to move the pusher member 50 from the retracted position to the extended position. The pair of guide rods 66 provide additional support for the pusher member 50. Each of the guide rods 66 includes a stop member 80 that contacts the guide block 68 to provide a limit on the amount of movement possible for the pusher member 50. Additionally, inner proximity switch 71a senses when the stop member 80 reaches the guide block 68, and provides a signal for initiating retraction of drive cylinder 52. Outer proximity sensor 71b senses the presence of stop member 80 upon retraction of drive cylinder 52, and provides a signal that drive cylinder 52 is in position to receive an article 20.

After an article 20 enters the transfer location 39 and is supported by the transfer platform 44, a part-in-place sensor 81 (FIG. 3) senses the presence of the article 20 to activate the drive cylinder 52 of the article pusher assembly 14 is activated to move the pusher member 50 from the retracted position to its extended position. As the pusher member 50 is moved to the extended position, the article 20 is pushed off of the transfer platform 44 and onto a stack support platform 82. As shown in FIG. 3, the stack support platform 82 is supported above the base plate 46 by a pair of upright supports 84, such that the upper surface of the stack support platform 82 is generally coplanar with the upper surface of the transfer platform 44. If the present article 20 supported by the transfer platform 44 is the first article of a new stack, the article 20 is pushed along the support platform 82 until it contacts the back-up slide assembly 18. The back-up slide assembly 18 provides support for the stack of articles 20 to be assembled along the support platform 82.

As the articles 20 are pushed onto the support platform 82, the outermost article 20 is pressed into contact with a backstop 86. The backstop 86 includes an angled support bracket 88 having a vertical portion 90 and a horizontal portion 92. A cushion member 94 is secured to the front face of the vertical portion 90 to prevent damage to the articles 20 as they are pressed against the backstop 86.

The support bracket 88 contacts cylinder rod 96 of a back-up cylinder 98. The back-up cylinder 98 in turn is supported above the support platform 82 by a bracket 100 that is secured at one end to upright support 84.

At the start of the assembly of a stack 102 of individual articles 20, the cylinder rod 96 of the back-up cylinder 98 is fully extended such that the cushion member 94 on the backstop 86 is positioned above a chamfered surface 104 on the inner edge of the support platform 82. As the first article 20 is pushed from the transfer platform 44 by the article pusher assembly 14, the article 20 engages the backstop 86 and moves the backstop 86 away from the chamfered surface 104 of the support platform 82. The proximity sensor and stop member 80 contained on the article pusher assembly 14 controls the movement of the pusher member 50 such that the article 20 on the transfer platform 44 is pushed only far enough to be completely above the support platform 82 and clear of transfer platform 44.

During the assembly of the stack 102, the back-up cylinder 98 is not pressurized, such that the backstop 86 and cylinder rod 96 can freely move inward from the extended position. In the preferred embodiment of the invention, the back-up slide assembly 18 includes a friction device 106 that can be adjusted to provide a friction force that opposes the outward movement of the backstop 86 from the extended position. As can best be seen in FIG. 4, the friction device 106 includes a friction block 108 that is held in contact with the lower surface 110 of the support platform 82 by a pair of compression springs 112, only one of which is shown in FIG. 4. The compression springs 112 are positioned above the horizontal portion 92 of the support bracket 88 and are captured between a washer 114 and head 116 of a bolt 118. Threaded portion 120 of bolt 118 is received within threaded passages formed in friction block 108 such that the compression spring 112 exerts an upward bias force to pull the friction block 108 into contact with the lower surface 110 of the support platform 82. Friction block 108 defines a pair of chamfered upper edges 121, which engage mating chamfered edges formed on support platform 82 between its lower surface 110 and a slot 122 defined by support platform 82. As can be seen in FIG. 3, the friction device 106 includes a pair of bolts 118 and compression springs 112 mounted above the horizontal portion 92 of the backstop 86.

As can be seen in FIG. 4, the shank of each of the bolts 118 passes through the slot 122, which is positioned in the center of the support platform 82 and extending along its longitudinal length. The amount of friction supplied by the friction device 106 can be increased or decreased by tightening each of the bolts 118 within the friction block 108. Since the back-up cylinder 98 is not pressurized during the assembly of the stack 102, the friction device 106 provides the required force to hold the backstop 86 in place along the support platform 82 as each article 20 is added to the stack 102. In this manner, the friction device 106 allows the backstop 86 to support the outermost article of the stack 102.

A bolt and nut assembly 124 is also attached to the friction block 108. The bolt and nut assembly 124 interacts with a proximity sensor 125 for providing a signal indicating that backstop 86 is in its home position and ready for creation of a stack. When a desired number of articles 20 have been pushed onto support platform 82 as determined by the computer controller of stacker mechanism 20, the computer controller initiates discharge of the stack 102 off of the support platform 82. Discharge of stack 102 can be initiated when stack 102 is either a full stack as determined by the number of each type of article 20 required to make up a full stack, or when stack 102 is a partial stack such as at the end of an order.

The stack pusher assembly 16 operates to push the assembled stack 102 of articles 20 from the support platform 82 and onto the angled outfeed conveyor assembly 22, as best shown in FIG. 2. The stack pusher assembly 16 includes a support bracket 126 secured to the base plate 46 by a flange 127. A pusher plate 128 is mounted to a mounting block 130. The mounting block 130 receives a pair of guide rods 132 and the cylinder rod (not shown) of a drive cylinder 134. Both of the guide rods 132 and the cylinder rod of drive cylinder 134 pass through a mounting block 136 that is supported on the support bracket 126. Each of the guide rods 132 includes a stop member 138 that contacts the mounting block 136 to limit the amount of movement of the pusher plate 128. In the preferred embodiment of the invention, the drive cylinder 134 is an air cylinder that can be driven in both the forward and reverse directions.

When the drive cylinder 134 is activated, the cylinder rod of the drive cylinder 134 moves the pusher plate 128 from the retracted position shown in FIG. 2 to an extended position. In the extended position, the bottom edge 139 of the pusher plate 128 is spaced far enough from the support platform 82 such that the pusher plate 128 can pass over the backstop 86. Thus, the stack pusher assembly 16 can be operated without fully retracting the backstop 86, thereby allowing partial stacks to be pushed onto the outfeed conveyor assembly 12. Additionally, the spacing between the backstop 86 and the pusher plate 128 allows the backstop 86 to begin the return cycle while the stack pusher assembly 16 is returning to the retracted position.

As the pusher plate 128 moves toward its extended position, the pusher plate 128 initially contacts the stack 102 and pushes the stack 102 forward along the support platform 82 and onto rollers 140 included in the outfeed conveyor assembly 12 As can best be seen in FIG. 2, a hold-back strip 141 is positioned between the support platform 82 and the outfeed conveyor assembly 12. The hold-back strip 141 is angled relative to the support platform 82. The hold-back strip 141 prevents the stack 102 from prematurely creeping onto the outfeed conveyor assembly 12 due to vibration and gravity. Thus, the pusher plate 128 must push the stack 102 over the hold-back strip 141 to move the stack 102 onto the outfeed conveyor assembly 12.

Since the outfeed conveyor assembly 12 is angled downward, the stack 102 slides down the series of rollers 140. A pair of guide members 142 are positioned to maintain the integrity of the assembled stack 102 of articles 20 as the stack travels down the outfeed conveyor assembly 12. In a manner as is known, extendible and retractable stack retaining plates may be positioned at intervals along the length of outfeed conveyor assembly 12 between rollers 140, so as to retain a series of stacks on outfeed conveyor assembly 12 and control movement of the stacks toward the downstream end of outfeed conveyor assembly 12.

Figures 5, 6:
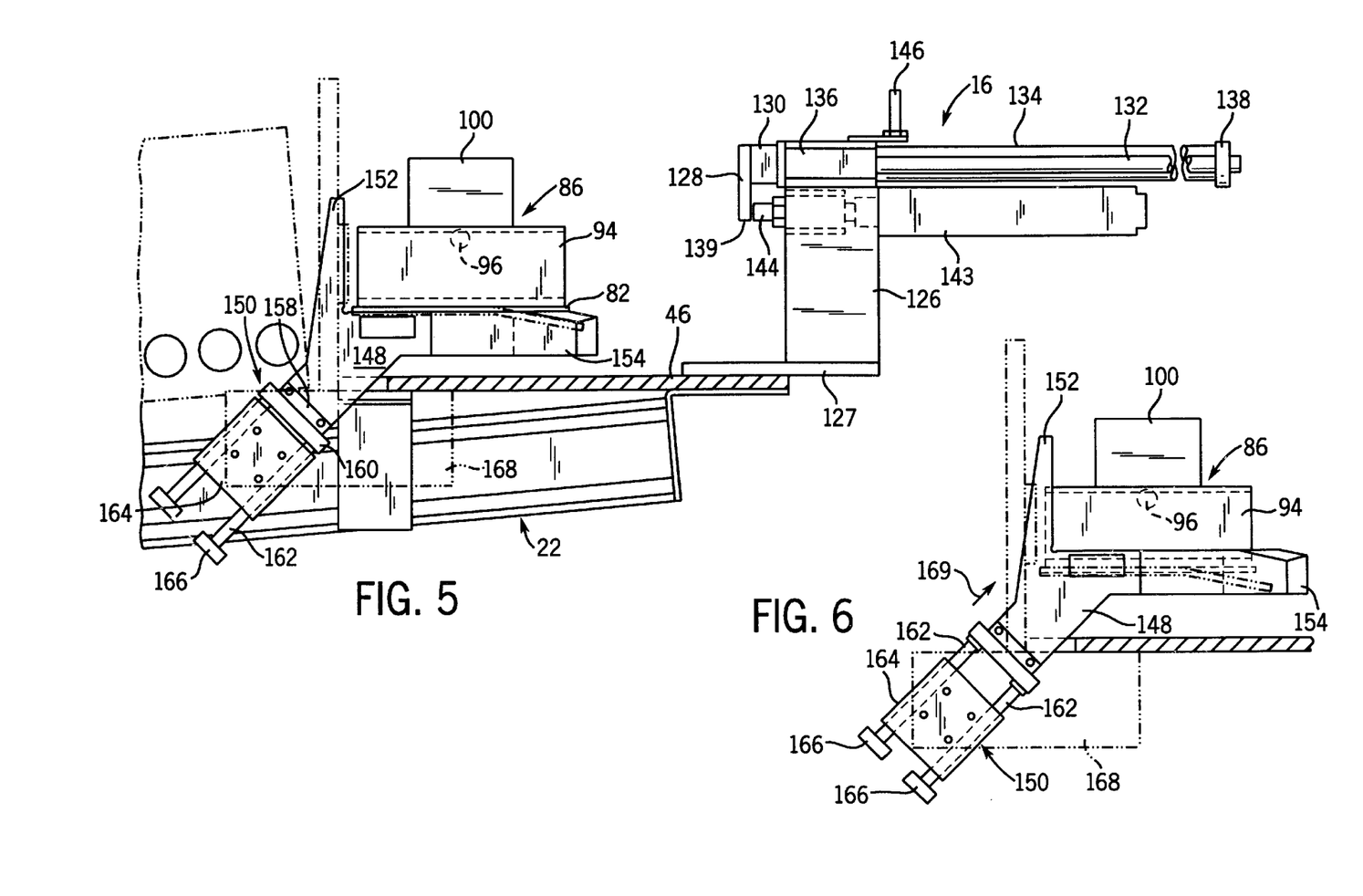
FIG. 5 is a sectional view taken along line 5—5 of FIG. 3 showing a hold-back assembly, which forms a part of the stacker mechanism of the present invention, in a retracted position.
FIG. 6 is a view similar to FIG. 5 showing the hold-back assembly in an extended position.

Referring now to FIG. 5, the stack pusher assembly 16 includes an air cylinder 143 with a rubber dampener 144 which, when extended, limits the return stroke of pusher assembly 16, such as for use with relatively short articles 20. Additionally, a proximity sensor 146 is positioned above one of the guide rods 132 such that the proximity sensor 146 senses when the stop member 138 is positioned beneath the proximity sensor 146. Upon detecting the stop member 138, the proximity sensor 146 halts operation of the drive cylinder 134. In this manner, the proximity sensor 146 and stop member 138 limit the movement of the pusher plate 128 and thus define the fully extended position for the stack pusher assembly 16.

As can be seen in FIGS. 2 and 3, a hold-back member 148 is positioned between the transfer platform 44 of the transfer location 39 and the support platform 82. The hold-back member 148 is movable between an extended, retaining position and a retracted, transfer position, as shown in FIGS. 5 and 6. In the transfer position shown in FIG. 5, the hold-back member 148 allows articles 20 to be pushed from the transfer platform 44 to the support platform 82 by the article pusher assembly 14. In the retaining position of FIG. 6, the hold-back member 148 supports the innermost article of the stack 102 of articles 20 to prevent the innermost article from falling back onto the transfer platform 44 after it has been moved to the support platform 82.

Shown in FIGS. 5 and 6 is a hold-back assembly 150 including the hold-back member 148. The hold-back member 148 includes a vertical arm 152 and a horizontal arm 154. As can be seen in FIG. 3, the horizontal arm 154 includes an angled upper edge surface 156 that is generally aligned with the chamfered edge 104 of the support platform 82 when the hold-back member 148 is in its transfer position. The angled surface formed by the upper edge 156 and the edge 104 helps guide individual articles 20 onto the support platform 82.

Referring back to FIG. 5, the hold-back member 148 includes an attachment portion 158 that is attached to a mounting block 160. The mounting block 160 is attached to drive rods 162 of a drive cylinder 164. The opposite end of each drive rod 162 includes a stop member 166 that limits the movement of the drive rods 162 and defines the retaining position for the hold-back member 148, as shown in FIG. 6. Additionally, the stop members 166 are sensed by a proximity sensor (not shown) mounted to the cylinder body. When the proximity sensor detects the stop member 166, the movement of the hold-back member 148 is terminated, thereby defining the retaining position of the hold-back member 148 as shown in FIG. 6.

As can be seen in FIGS. 5 and 6, the drive cylinder 164 is mounted to mounting block 168 at an angle relative to the horizontal support platform 82 and backstop 86. Thus, when the drive cylinder 164 moves the hold-back member 148 from its transfer position shown in FIG. 5 to the retaining position shown in FIG. 6, as indicated by arrow 169, the horizontal arm 154 moves upward, while the vertical arm 152 moves horizontally. When the hold-back member 148 is moved into the retaining position in this manner, the horizontal arm 154 and the vertical arm 152 move into contact with the outermost article in the stack currently being assembled. Thus, the hold-back member 148 supports the outermost article 20 to prevent the outermost article 20 from falling back onto the transfer platform 44. In this manner, the combination of the hold-back member 148 and the backstop 86 supports the stack 102 of articles 20 while the stack is being assembled.

Figure 7A:
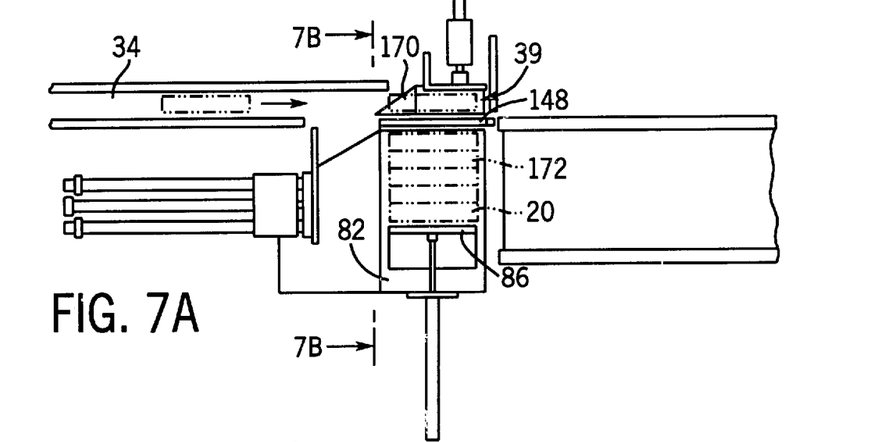
FIGS. 7A–7F illustrate a method of assembling a stack of articles, carried out by the stacker mechanism of FIGS. 1–6, in accordance with the present invention.
Figure 7B:
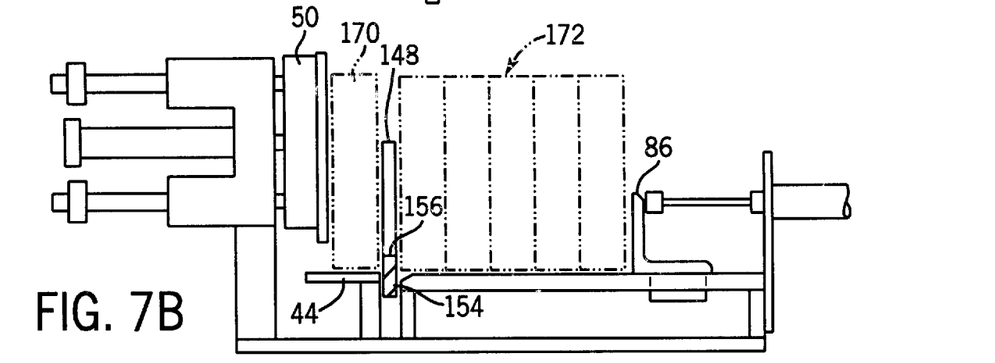

Referring now to FIGS. 7A–7F, the operation of the stacker mechanism 10 in constructing a stack 102 of articles 20 will now be discussed. As shown in FIG. 7A, a partial stack 172 of individual articles 20 are assembled on the support platform 82. Additionally, an article 170 is positioned within the transfer location 39 and supported by the transfer platform 44, as shown in FIG. 7B.

At this point in the operation, the outermost article of the partial stack 172 is supported by backstop 86, while the innermost article is supported by the hold-back member 148, which is in its retaining position. As can be seen in FIG. 7B, the upper edge 156 of the horizontal arm 154 extends above the lower edge of the outermost article of the partial stack 172. At the same time, the vertical arm 152 of the hold-back member 148 extends past the side edge of the innermost article of partial stack 172, such that the hold-back member 148 provides support for the partial stack 172.

Figure 7C:
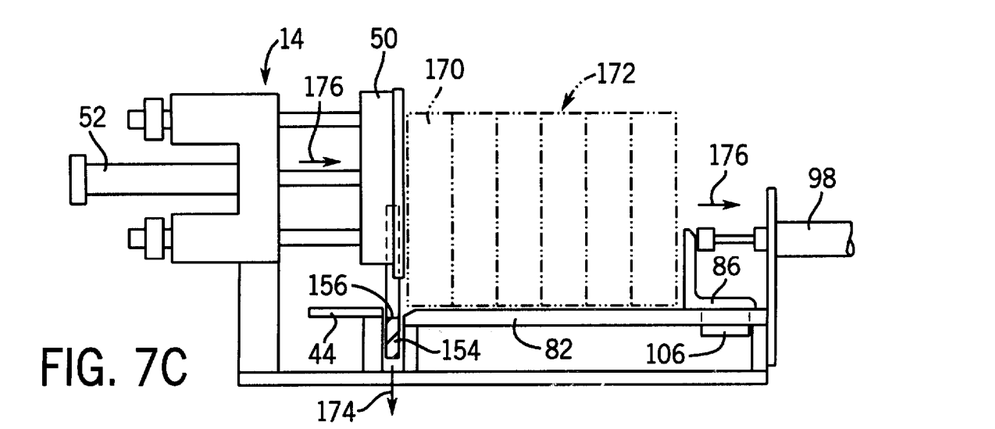

Since the article 170 is in position on the transfer platform 44 and is ready to be inserted into the partial stack 172, the drive cylinder 164 of the hold-back assembly 150 is operated to move the hold-back member 148 from the retaining position shown in FIG. 7B to the transfer position shown in FIG. 7C. Movement of the hold-back member 148 to the transfer position causes the horizontal arm 154 to move downward, as shown by arrow 174. When in the transfer position, the upper edge 156 of the horizontal arm 154 is located below the lower edge of the article 170. Simultaneously, the vertical arm 152 of hold-back member 148 is moved outwardly past the side edge of article 170.

Once the hold-back member 148 has been moved to the transfer position, the drive cylinder 52 of the article pusher assembly 14 is activated, thereby causing the pusher member 50 to move from the retracted position shown in FIG. 7B to the extended position shown in FIG. 7C, as illustrated by arrow 176. Movement of the pusher member 50 pushes the article 170 from the transfer platform 44 onto the support platform 82.

As the article 170 is pushed by the article pusher assembly 14, the partial stack 172 is pressed against the backstop 86. Since the back-up cylinder 98 is not pressurized, the backstop 86 is able to move in the direction shown by arrow 176 against the friction force provided by the friction device 106. As can be understood in FIGS. 2, 3 and 7C, when the pusher member 50 is in the extended position, the stop surfaces 56 and 58 prevent articles traveling down the loading guideway 34 from contacting either the guide rods 66 or the drive rod 72.

Figure 7D:
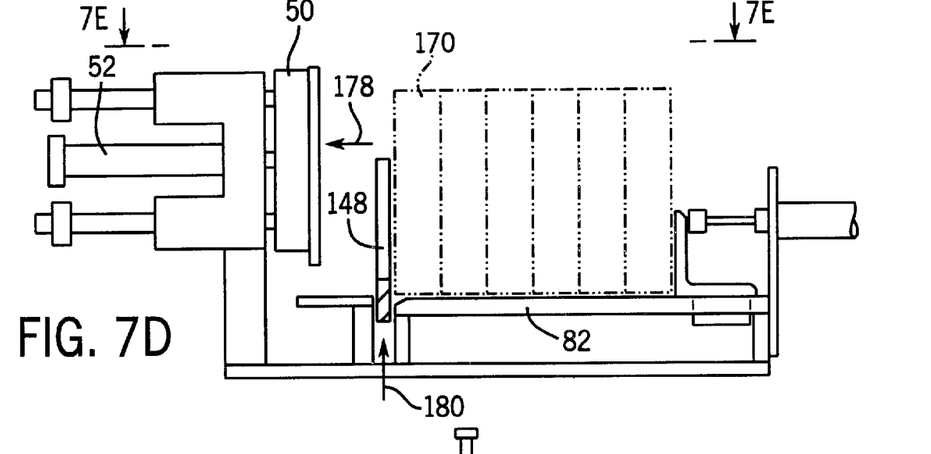

After the proximity sensor on the article pusher assembly 14 detects that the pusher member 50 has pushed the article 170 onto the support platform 82, the drive cylinder 52 reverses direction to move the pusher member 50 back into the retracted position, as shown by arrow 178 in FIG. 7D. Once the pusher member 50 is in its retracted position, the hold-back member 148 is again moved to its retaining position, as shown by arrow 180. As previously discussed, in the retaining position, the hold-back member 148 provides support for the innermost article, which is now article 170. This process is repeated until a complete stack of articles is assembled on the support platform 82.

Figure 7E:
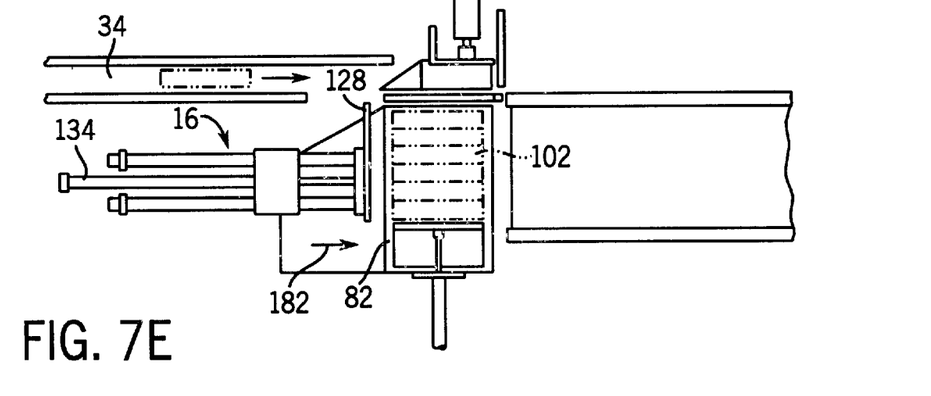
Figure 7F:
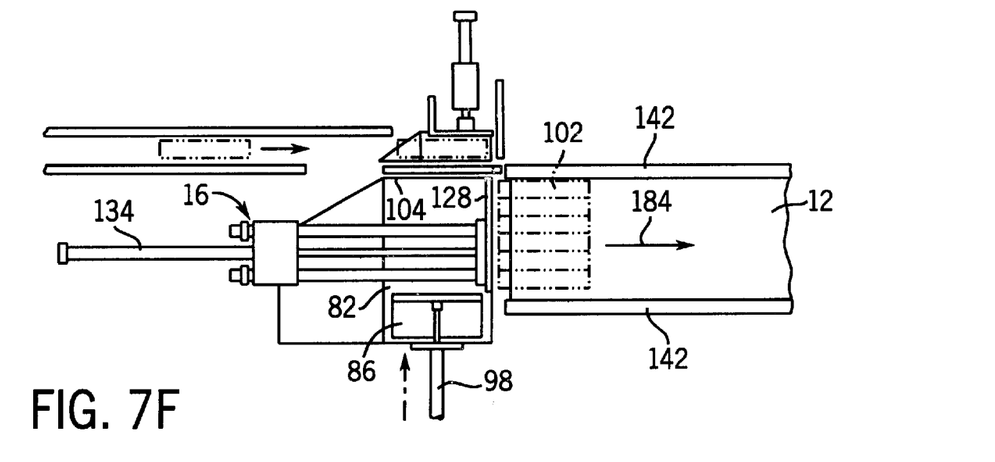

Once a complete stack is assembled, as determined by the computer control of stacker mechanism 10, the drive cylinder 134 of stack pusher assembly 16 is activated to move the pusher plate 128 from the retracted position shown in FIG. 7E to the extended position shown in FIG. 7F, as indicated by arrow 182. As the drive cylinder 134 moves the pusher plate 128 to the extended position, the pusher plate 128 contacts the assembled stack 102 of articles and pushes the stack off of the support platform 82 and onto the outfeed conveyor assembly 12 as indicated by arrow 184. The guide members 142 of the outfeed conveyor assembly 12 are spaced by the width of the assembled stack 102, such that the guide members 142 support each side of the stack 102 to prevent the stack from separating. Since the outfeed conveyor assembly 12 is angled downward, the assembled stack 102 slides down the outfeed conveyor assembly 12 for further processing.

Once the assembled stack 102 has been pushed off the support platform 82, the drive cylinder 134 of the stack pusher assembly 16 is reversed to move the pusher plate 128 back into the retracted position shown in FIG. 7E. Once the pusher plate 128 is in the retracted position, the back-up cylinder 98 is operated to move the backstop 86 into its fully extended home position adjacent to the outer edge 104 of the support platform 82. Once in the extended position, the pressure to the back-up cylinder 98 is removed such that it can again freely move to the retracted position as another stack is assembled on the support platform 82.

The stacker mechanism 10 of the present invention is thus able to assemble a stack of individual articles and move the assembled stack onto an outfeed conveyor for further processing downstream from the stacker mechanism 10. As discussed, the stacker mechanism 10 is able to handle articles 20 having a variety of sizes. Additionally, the stacker mechanism 10 can assemble and discharge either a full stack or a partial stack.

Various alternatives and embodiments are contemplated as being within the scope of the following claims particularly pointing out and distinctly claiming the subject matter regarded as the invention.

I claim:

1. A mechanism for forming a stack of articles, wherein each article defines a side edge and a bottom edge, comprising:
   a support platform for supporting the stack of articles as the stack is being formed;
   a guide arrangement for supplying articles in a singulated fashion to a transfer location adjacent to the support platform;
   an article pusher assembly including an extendible and retractable pusher member engageable with an article at the transfer location for moving the article from the transfer location onto the support platform, wherein the pusher member includes a pushing surface and a stop surface, the stop surface being disposed normally to the pushing surface, wherein the pushing surface engages the article at the transfer location and the stop surface engages articles being supplied by the guide arrangement when the pusher member is in the extended position to prevent movement of articles into the transfer location; and
   a hold-back member located between the transfer location and the support platform, wherein the hold-back member includes a transverse section and a upstanding section extending upwardly from the transverse section, and wherein the hold-back member is movable between a transfer position in which the hold-back member allows an article to pass from the transfer location onto the support platform under the influence of the pusher member, and a retaining position in which the hold-back member is positioned such that the transverse section is located above the bottom edge of the article and the upstanding section is located inwardly of the side edge of the article, wherein the hold-back member in its retaining position prevents passage of articles between the support platform and the transfer location and engages the endmost article in the stack of articles to maintain the stack of articles in position on the support platform.

2. A mechanism for forming a stack of articles, wherein each article defines a side edge and a bottom edge, comprising:
   a support platform for supporting the stack of articles as the stack is being formed;
   a guide arrangement for supplying articles in a singulated fashion to a transfer location adjacent to the support platform;
   an article pusher assembly including an extendible and retractable pusher member engageable with an article at the transfer location for moving the article from the transfer location onto the support platform; and
   a hold-back member located between the transfer location and the support platform, wherein the hold-back member is mounted to an inclined drive arrangement which is operable to move the hold-back member between a transfer position in which the hold-back member allows an article to pass from the transfer location onto the support platform under the influence of the pusher member, and a retaining position in which the hold-back member is simultaneously moved transversely and upwardly such that a portion of the hold-back member is located inwardly of the side edge of the article and a portion of the hold-back member is located above the bottom edge of the article, wherein the hold-back member in its retaining position prevents passage of articles between the support platform and the transfer location and maintains the stack of articles in position on the support platform;
   wherein the hold-back member includes a transverse section and an upstanding section extending upwardly from the transverse section, wherein operation of the inclined drive arrangement to move the hold-back member to the transfer position is operable to position the upstanding section of the hold-back member inwardly of the side edge of the article and to position the transverse section of the hold-back member above the bottom edge of the article;
   wherein the inclined drive arrangement comprises a cylinder assembly having an extendible and retractable rod to which the hold-back member is mounted, wherein the cylinder assembly extends along a longitudinal axis oriented at an angle relative to a support surface defined by the support platform with which the bottom edges of the articles are engaged.

3. A mechanism for forming a stack of articles, comprising:
   a support platform for supporting the stack of articles as the stack is being formed;
   a guide arrangement for supplying articles in a singulated fashion to a transfer platform adjacent to the support platform;
   an article pusher assembly including an extendible and retractable pusher member engageable with an article positioned on the transfer platform for moving the article from the transfer platform onto the support platform;

a back-up slide assembly for supporting an outermost article of the stack as the stack is being formed, the back-up slide assembly including a backstop positioned to contact the outermost article and being movable along the support platform, wherein the back-up slide assembly includes a spring-biased friction device positioned between the backstop and the support plate, wherein the friction device exerts a friction force to restrict movement of the backstop along the support platform as the stack of articles is being formed, wherein the spring-biased friction device includes spring members that force a friction member into contact with the support platform to generate the friction force; and a hold-back member located between the transfer platform and the support platform, wherein the hold-back member is movable between a transfer position in which the hold-back member allows an article to pass from the transfer platform onto the support platform under the influence of the pusher member, and a retaining position in which the hold-back member prevents passage of articles between the support platform and the transfer platform for maintaining the stack of articles in position on the support platform.

4. The mechanism of claim 3 wherein the friction device is adjustable to vary the amount of friction force generated.

5. In an apparatus for forming a stack of articles, including a support platform, a transfer location, and a pusher mechanism for moving the articles in a one-at-a-time manner onto the support platform from the transfer location, the improvement comprising:

a hold-back mechanism located between the transfer location and the support platform, wherein the hold-back mechanism is movable between a transfer position and a retaining position independent of movement of the articles from the transfer location to the support location, wherein the hold-back mechanism includes an engagement member having a lower engagement area and an upwardly extending engagement area, and a drive arrangement for moving the engagement member, wherein when the hold-back mechanism is in the transfer position, the drive arrangement positions the engagement member out of the path of movement of articles between the transfer location and the support platform, and wherein when the hold-back mechanism is in the retaining position, the engagement member engages the endmost article in the stack of articles such that the lower engagement area engages the endmost article toward a bottom edge of the article and the upwardly extending engagement area engages the endmost article toward a side edge of the article on the support platform to maintain the stack of articles on the support platform;

wherein the drive arrangement of the hold-back mechanism is oriented such that, when the hold-back mechanism is in the retaining position, the upwardly extending engagement area is located inwardly of the side edge of the article and the lower engagement area is located above the bottom edge of the article, and wherein operation of the drive arrangement to position the hold-back mechanism in the transfer position moves the upwardly extending engagement area outwardly of the article side edge and the lower engagement area below the article bottom edge;

wherein the drive arrangement comprises a cylinder assembly having a movable member to which the engagement member is mounted, wherein operation of the cylinder assembly functions to move the hold-back mechanism between the transfer position and the retaining position.

6. The improvement of claim 5, wherein the cylinder assembly extends along a longitudinal axis which is oriented at an angle relative to a support defined by the support platform engaged by the bottom surface of the articles when the articles are positioned on the support platform.

7. A mechanism for forming a stack of articles, wherein each article defines a side edge and a bottom edge, comprising:

a support platform for supporting the stack of articles as the stack is being formed;

a guide arrangement for supplying articles in a singulated fashion to a transfer location adjacent to the support platform;

an article pusher assembly including an extendible and retractable pusher member engageable with an article at the transfer location for moving the article from the transfer location onto the support platform;

a hold-back member located between the transfer location and the support platform, wherein the hold-back member includes a transverse section and a upstanding section extending upwardly from the transverse section, and wherein the hold-back member is movable between a transfer position in which the hold-back member allows an article to pass from the transfer location onto the support platform under the influence of the pusher member, and a retaining position in which the hold-back member is positioned such that the transverse section is located above the bottom edge of the article and the upstanding section is located inwardly of the side edge of the article, wherein the hold-back member in its retaining position prevents passage of articles between the support platform and the transfer location and engages the endmost article in the stack of articles to maintain the stack of articles in position on the support platform; and a drive assembly coupled to the hold-back member, wherein the drive assembly is operable to move the hold-back member between the transfer position and the retaining position, wherein the drive assembly is positioned to move the hold-back member in an inclined direction relative to the support platform, wherein operation of the drive assembly to move the hold-back member from the transfer position to the retaining position moves the upstanding portion transversely and the transverse portion upwardly into the path of movement of articles between the transfer location and the support platform.

8. The mechanism of claim 7 further comprising a back-up slide assembly positioned to move along the support platform, the back-up slide assembly including a backstop that contacts an outermost portion of the stack of articles to support the stack of articles on the support platform.

9. The mechanism of claim 8 wherein the backstop includes a cushion member, the cushion member contacting the stack as the stack is formed on the support platform.

10. A mechanism for forming a stack of articles, comprising:

a support platform for supporting the stack of articles as the stack is being formed;

a guide arrangement for supplying articles in a singulated fashion to a transfer platform adjacent to the support platform;

an article pusher assembly including an extendible and retractable pusher member engageable with an article positioned on the transfer platform for moving the article from the transfer platform onto the support platform;

a back-up slide assembly for supporting an outermost article of the stack as the stack is being formed, the back-up slide assembly including a backstop positioned to contact the outermost article and being movable along the support platform;

a hold-back member located between the transfer platform and the support platform, wherein the hold-back member is movable between a transfer position in which the hold-back member allows an article to pass from the transfer platform onto the support platform under the influence of the pusher member, and a retaining position in which the hold-back member prevents passage of articles between the support platform and the transfer platform for maintaining the stack of articles in position on the support platform, wherein the hold-back member includes a horizontal portion and a vertical portion, such that when the hold-back member is in the retaining position, both the horizontal portion and the vertical portion of the hold-back member contact an innermost article of the stack to support the stack on the support platform; and a drive assembly including an output member coupled to the hold-back member for moving the hold-back member between the transfer position and the retaining position, wherein the output member is movable at an angle relative to the support platform and transfer platform, such that when the hold-back member is moved from the transfer position to the retaining position by movement of the output member, the horizontal portion of the hold-back member moves vertically and the vertical portion of the hold-back member moves horizontally.

11. The mechanism of claim 10 further comprising a stack pusher assembly positioned adjacent to the support platform for moving the stack of articles from the support platform to an outfeed conveyor assembly, the stack pusher assembly including a pusher plate movable between an extended position and a retracted position, such that when the pusher plate is moved to the extended position, the pusher plate contacts the stack of articles to push the stack of articles off of the support platform and onto the outfeed conveyor assembly.

12. The mechanism of claim 10 wherein the backstop includes a cushion member, the cushion member containing the stack as the stack is formed on the support platform.

13. A mechanism for forming a stack of articles, wherein each article defines a side edge and a bottom edge, comprising:

a support platform for supporting the stack of articles as the stack is being formed;

a guide arrangement for supplying articles in a singulated fashion to a transfer location adjacent to the support platform;

an article pusher assembly including an extendible and retractable pusher member engageable with an article at the transfer location for moving the article from the transfer location onto the support platform;

a hold-back member located between the transfer location and the support platform, wherein the hold-back member includes a transverse section and a upstanding section extending upwardly from the transverse section, and wherein the hold-back member is movable between a transfer position in which the hold-back member allows an article to pass from the transfer location onto the support platform under the influence of the pusher member, and a retaining position in which the hold-back member is positioned such that the transverse section is located above the bottom edge of the article and the upstanding section is located inwardly of the side edge of the article, wherein the hold-back member in its retaining position prevents passage of articles between the support platform and the transfer location and engages the endmost article in the stack of articles to maintain the stack of articles in position on the support platform; and a back-up slide assembly positioned to move along the support platform, the back-up slide assembly including a backstop that contacts an outermost portion of the stack of articles to support the stack of articles on the support platform, wherein the back-up slide assembly further includes a friction device positioned between the backstop and the support platform, the friction device exerting a friction force to restrict the movement of the backstop along the support platform as the stack of articles is being formed.

14. The mechanism of claim 13 wherein the hold-back member is coupled to a drive assembly which is operable to move the hold-back member between the transfer position and the retaining position.

15. The mechanism of claim 13 further comprising a stack pusher assembly positioned adjacent the support platform and including an extendible and retractable pusher member engageable with the stack of articles formed on the support platform, the pusher member being moveable to engage the stack of articles and move the stack of articles from the support platform to an outfeed conveyor assembly.

16. The mechanism of claim 13 wherein the transfer location includes a transfer platform positioned to support each article supplied by the guide arrangement, the transfer platform being positioned between the article pusher assembly and the hold-back member, such that the article pusher assembly moves the article from the transfer platform to the support platform.

17. The mechanism of claim 13 wherein the friction device includes a friction member and spring members that exert a bias force to press the friction member into contact with the support platform to generate the friction force.

18. The mechanism of claim 17 wherein the support platform includes a slot formed along its longitudinal length, such that the backstop is freely movable along the support platform while the friction device passes through the slot.

* * * * *

UNITED STATES PATENT AND TRADEMARK OFFICE
CERTIFICATE OF CORRECTION

PATENT NO. : 6,419,442 B1  Page 1 of 1
DATED : July 16, 2002
INVENTOR(S) : Terrence E. O'Brien

It is certified that error appears in the above-identified patent and that said Letters Patent is hereby corrected as shown below:

Column 12,
Line 6, after "support" and before "defined" insert -- surface --.

Column 13,
Line 48, delete "containing" and substitute therefore -- contacting --.

Signed and Sealed this

Third Day of December, 2002

JAMES E. ROGAN
*Director of the United States Patent and Trademark Office*